Patented Aug. 9, 1932

1,870,308

UNITED STATES PATENT OFFICE

ABRAHAM SIDNEY BEHRMAN, OF CHICAGO, ILLINOIS

MANUFACTURE OF HYDROBROMIC ACID

No Drawing.     Application filed June 15, 1931.  Serial No. 544,710.

This invention relates to the preparation of hydrobromic acid, and has particular reference to the synthesis of an aqueous solution of hydrobromic acid from bromine, carbon and water. The present application constitutes a continuation in part of my copending application, Serial No. 370,737, filed June 13, 1929.

A primary object of my invention is to provide a simple and economically desirable method of preparing hydrobromic acid. An additional object is to provide an improved method of preparing and concentrating or purifying hydrobromic acid. A further object is to provide a method of producing aqueous hydrobromic acid directly from water and bromine. These and other objects will appear during the course of the following description of a preferred embodiment of my invention.

In the prior art it has been particularly difficult to prepare hydrobromic acid. The customary method of preparing an acid by reacting its salt with sulphuric acid is not practical in the case of hydrobromic acid, due to oxidation of the hydrogen bromide by the sulphuric acid. One method which has been used somewhat extensively comprises hydrolyzing phosphorous tribromide, but as with the other known processes for producing hydrobromic acid, this method is undesirable from an economical standpoint.

In accordance with my invention bromine is contacted with water in the liquid phase and carbon. As a result, the carbon is oxidized to carbon dioxide, while the bromine is converted into hydrogen bromide which immediately dissolves in the excess water.

It is possible to obtain an effective reaction by contacting the carbon with an aqueous solution of bromine, with a mixture of liquid bromine and water, or with bromine in the gaseous phase and water. From the standpoint of efficiency, it is ordinarily preferred to effect the process by employing gaseous bromine.

The carbons used in accordance with my invention may be active or activated carbons, wood charcoals, bone char, lignite, and other utilizable forms. Active or activated carbons, of which there are several suitable varieties now available, are the preferred form of carbon.

One embodiment of my invention adapted to the continuous production of a solution of hydrobromic acid, comprises passing bromine gas upwardly through a bed of lump or granular activated carbon contained in a suitable receptacle. Water is caused to trickle downwardly through the bed. The bottom of the chamber containing the bed of carbon may be provided with a suitably controlled outlet and/or liquid seal in order to permit discharge of the solution of hydrobromic acid formed, while preventing the escape of bromine gas. Suitable flow meters and control devices may be provided for the bromine gas and water, and the amounts and proportion of these reagents are adjusted in accordance with the concentration of acid solution desired. Other conditions being equal, the depth of carbon bed in a reaction chamber has an important bearing on the maximum concentration of acid obtainable. In some laboratory experiments, for example, increasing the depth of carbon bed from about two inches to about ten inches made it possible to increase the concentration of acid in the effluent from about 2.5% to about 15.5% by weight of HBr.

In reducing the normally liquid bromine to the gaseous state, it is desirable to pass air through the liquid bromine to provide a mixture of air and gaseous bromine, which mixture is contacted with water in the presence of carbon as described heretofore. This modification has the advantage that the air absorbs heat liberated in the exothermic reaction of the bromine, water, and carbon.

However, admixture with air is not essential to operation of the process. The bromine may be reduced to the gaseous state by the application of a suitable amount of heat. Under these conditions, the water absorbs the heat of reaction.

It is generally desirable to adjust operating conditions so that the temperature rise throughout the system is minimized, having in mind the highly exothermic nature of the reaction:

(1) $C + 2Br_2 + 2H_2O = 4HBr + CO_2$ by which, presumably, my process functions. This reaction is conveniently divided into two stages:

(a) $2Br_2 + 2H_2O = 2HBr + 2HBrO$
(b) $2HBrO + C = 2HBr + CO_2$

It is generally preferable to keep the reaction temperature well below the boiling point of water.

As a rule the reaction is carried out under such conditions that no free bromine escapes with the exit gases. Operating in this way, complete separation of the waste gases is effected in the reaction chamber itself. The waste gases may be led off from the reaction chamber and discharged to the atmosphere, or collected and used, as desired. This method of operation is not mandatory, however, as, in the event that the exit gases contain free bromine, they may be led to the gas inlet of a succeeding reaction chamber. If the desired concentration of acid is not obtained from one reaction chamber, this solution may be strengthened by using it in place of part, or all, of the water employed in one or more subsequent reaction chambers; or other methods of concentration, such as distillation, may be employed.

Acid of high concentration may be readily prepared by the process of the present invention.

The solution of hydrobromic acid resulting from this process will generally contain free bromine. By passing this bromine-contaminated acid through a bed of carbon, or by other suitable treatment with carbon, the free bromine may be converted to hydrobromic acid.

It follows that the present process may also be utilized for the purification and/or concentration of solutions of hydrobromic acid. For example, instead of reacting water with carbon and bromine, it is possible to react an aqueous solution of hydrobromic acid with carbon and bromine so as to produce an acid of greater concentration. Or a solution of hydrobromic acid containing free bromine as an impurity or as a result of decomposition of the acid may be purified by contacting the solution with carbon as specified heretofore.

In the continuous method of preparing hydrobromic acid, the synthesis, concentration, and purification steps may all be carried out successively. In this case, a series of beds of carbon is provided and the water and/or solution of hydrobromic acid caused to flow successively through the beds. Bromine gas is introduced into the reaction chamber next to the last in the series, or into any or all of the reaction chambers except the last, depending on whether or not free bromine is permitted to be present in the exit gases from any reaction chamber. The flow of bromine is countercurrent to the flow of liquid, both with relation to a single reaction chamber, and to the series where series flow of the gas is employed. The last reaction chamber in the series, to which bromine is not admitted, is utilized for the conversion of any free bromine in the acid solution to hydrobromic acid.

The method of production of hydrobromic acid just described may be made completely continuous by providing means for the regular addition to the reaction chambers of carbon to replace that consumed in the chemical reaction. In case this is done, provision should also be made for removal of spent carbon, since generally it contains inert matter, the accumulation of which would decrease the efficiency of the reaction.

In another embodiment of my invention which is adapted to the intermittent or batch preparation of hydrobromic acid, bromine gas is passed through a chamber containing carbon and water, either an aqueous suspension of carbon, or a bed of granular carbon, the interstices of which are substantially completely filled with water. When the desired concentration of hydrobromic acid has been obtained, any excess carbon is removed by filter pressing or other appropriate means. In this modification, it is generally preferable to employ a number of reaction chambers in series, as it is usually not economical to provide complete absorption of the bromine in one chamber.

The bromine and water may be mixed to form bromine-water and the latter passed downwardly through a bed of carbon, whereby a solution of hydrobromic acid is formed. This solution may be concentrated by recirculation through the carbon after admixture with an additional supply of bromine. Continued recirculation results in the formation of a highly concentrated solution of hydrobromic acid. The process may be made substantially continuous by withdrawing a portion of the solution coming from the carbon bed and supplying an additional amount of water to maintain a substantially constant volume.

In each of the embodiments of my invention which have been described, it is obviously desirable that all reagents should be as pure as practicable. This applies not only to the bromine and to the water, but to the carbon as well. If the carbon contains an objectionable amount of hydrobromic acid-soluble matter, it is frequently desirable to subject the carbon, before use, to treatment with a strong, hot solution of hydrobromic acid to remove the objectionable impurities.

If the activity of the carbon is diminished to an undesirable extent before the carbon is consumed, in any embodiment of the invention, the carbon may be reactivated by the employment of heat, steam, or any other suitable method, the reactivation being carried out either inside or outside the reaction chamber, according to convenience.

In preparing a solution of hydrobromic acid by the continuous process described above, I have obtained excellent results with granular activated carbon prepared from Texas lignites, which is activated by distillation at high temperatures, followed by treatment with hydrochloric acid. A carbon bed made up of this material in particles ranging in size from about four to twelve mesh makes available a large amount of surface for reaction, while still making possible only a relatively small pressure loss through the bed. The same carbon may also be used successfully in the intermittent or batch method of preparation, in which method I have also used advantageously another activated carbon in powdered form which is prepared from paper mill waste liquors.

It will be apparent at once to one skilled in the art that many variations in amounts and proportions of reagents, in temperatures, in mechanical arrangements, and in operating and other conditions may be practiced in the application of the fundamental principles of my invention, and that the characteristics of the product obtained, and the economies of the production may consequently vary over a wide range. All such variations and modifications are comprised within the scope of my invention as defined in the appended claims.

I claim:

1. In the process of preparing a solution of hydrobromic acid, the step which comprises reacting bromine, water in the liquid phase, and carbon.

2. The process which comprises reacting bromine, water in the liquid phase, and carbon at temperatures below the boiling point of the water.

3. The process of preparing a solution of hydrobromic acid, which comprises passing bromine gas and water in the liquid phase countercurrently through a mass of carbon.

4. In the process of preparing a solution of hydrobromic acid, the step which comprises reacting gaseous bromine, water in the liquid phase, and carbon.

5. A process of concentrating hydrobromic acid, which comprises contacting an aqueous solution of hydrobromic acid with activated carbon and bromine.

6. A process of purifying an aqueous hydrobromic acid solution containing bromine, which comprises contacting said solution with carbon.

7. A process of producing concentrated hydrobromic acid, which comprises passing water successively through a series of carbon beds, introducing gaseous bromine into one or more beds before the last bed of the series, and causing said bromine to pass countercurrently to the flow of water through the successive beds.

8. A process of producing concentrated hydrobromic acid, which comprises passing water successively downwardly through a series of carbon beds, introducing bromine into the bottom of one or more of the beds before the last bed of the series, and causing said bromine to pass countercurrently to the flow of water upwardly through the successive beds.

9. The process of preparing a solution of hydrobromic acid, which comprises passing bromine gas into a body of water containing carbon, and concentrating the resultant hydrobromic acid.

10. The process of preparing a solution of hydrobromic acid, which comprises contacting water in the liquid phase and carbon with a sufficient amount of bromine to produce a solution containing a substantial amount of hydrobromic acid.

11. The process of preparing a solution of hydrobromic acid, which comprises passing bromine gas into a body of water in the presence of carbon until a maximum concentration is obtained.

12. A process for increasing the strength of an aqueous hydrobromic acid solution, which comprises introducing bromine into the aqueous hydrobromic acid solution and contacting said solution with carbon.

13. A process for preparing hydrobromic acid, which comprises passing an inert gas through liquid bromine to form a gaseous mixture containing bromine, and contacting said mixture with water in the liquid phase in the presence of carbon.

14. A process for preparing hydrobromic acid, which comprises subjecting water in the liquid phase to a succession of treatments with bromine and carbon.

In testimony whereof I have hereunto subscribed my name.

ABRAHAM SIDNEY BEHRMAN.